(12) United States Patent
Kim et al.

(10) Patent No.: US 6,627,343 B1
(45) Date of Patent: Sep. 30, 2003

(54) ELECTRIC ENERGY STORAGE DEVICE

(75) Inventors: Seong-Min Kim, Yongin (KR); Yong-Ho Jung, Taejeon (KR); Sun-Uk Kim, Seoul (KR)

(73) Assignee: Ness Capacitor Co., Ltd., Suwon-si (KR)

( * ) Notice: Subject to any disclaimer, the term of this patent is extended or adjusted under 35 U.S.C. 154(b) by 0 days.

(21) Appl. No.: 09/660,330

(22) Filed: Sep. 12, 2000

(30) Foreign Application Priority Data

Nov. 12, 1999 (KR) .............................. 99-50323

(51) Int. Cl.[7] ..................... H01M 6/42; H01M 2/22; H01G 4/32; H01G 4/38
(52) U.S. Cl. .................... 429/94; 429/149; 429/152; 429/160; 429/211; 361/305.1; 361/328; 361/522
(58) Field of Search ................... 429/94, 149–153, 429/160, 161, 211; 361/305.1, 328–330, 511, 522, 530, 541

(56) References Cited

U.S. PATENT DOCUMENTS 5,439,760 A * 8/1995 Howard et al. ............. 429/211
5,478,668 A * 12/1995 Gozdz et al. ............... 429/127
5,705,297 A * 1/1998 Warren ....................... 429/50

* cited by examiner

Primary Examiner—Randy Gulakowski
Assistant Examiner—Jonathan Crepeau
(74) Attorney, Agent, or Firm—Jacobson Holman PLLC

(57) ABSTRACT

Disclosed is an electric energy storage device having a large capacity and includes a thin active material layer and a plurality of integrated electrodes. The electric energy storage device comprises at least one electrode group in which a cathode, a separator and an anode are in regular sequence, repeatedly integrated and wound into a plate shape. The electrode group has lead lines collected at a predetermined place for a connection with a terminal. Since the cathode and anode are wound with the insertion of the separator between them, the increase of the number of the lead lines is advantageous. In addition, the lead lines can be preferably formed by cutting each portion of the electrode at once by utilizing an apparatus such as a press, the manufacture of the electric energy storage device having a large capacity is advantageous.

14 Claims, 6 Drawing Sheets

ELECTRIC ENERGY STORAGE DEVICE

BACKGROUND OF THE INVENTION

1. Field of the Invention

The present invention relates to an electric energy storage device and more particularly, to an electric energy storage device having a large capacity and including an electrode group manufactured by winding into a plate shape in order to facilitate an electrode integration and the manufacturing of the electric energy storage device.

2. Description of the Related Art

Recently utilizing electric energy storage device includes a battery, an electrolytic condenser, electric double layer capacitor, pseudo capacitor, etc. In particular, an electric chemical capacitor attracts much concern as an auxiliary energy storage device in a hybrid electric device into which the electric power is supplied by a rechargeable condenser. The electric double layer capacitor (EDLC) is a capacitor utilizing a constant charge phenomenon generated from an electric double layer formed at an interface between different phases.

FIG. 1 is a schematic diagram of a unit cell of a conventional and common electric energy storage device such as a battery and a capacitor. The unit cell of the conventional electric energy storage device includes a case 10 formed from a metal or a molded resin, electrodes of a cathode and an anode which are composed of a current collector 12 and active material layer 14, a separator 15 of a porous material provided between the cathode and the anode, to allow an ion conduction while preventing an electron conduction and an electrolyte 18 filled in case 10.

Active material layer 14 is an electric energy storing portion and different materials are utilized according to the type of the electric energy storage device. Current collector 12 discharges out the stored energy of active material layer 14 or transmits an externally applied electric energy to active material layer 14. Usually, current collector 12 is manufactured as a metal layer. However, aluminum electrolyte condenser includes a metal layer obtained by etching aluminum and then forming an aluminum oxide layer thereon. In this case, the active material layer and the current collector are not differentiated.

Separator 15 is provided between the cathode and the anode, to allow an ion conduction while preventing an electric conduction. A porous polypropylene or paper is widely used as separator 15. Electrolyte 18 is prepared by dissolving ion into a solvent so as to store an electric energy. Various electrolytes are utilized according to the type of the active material.

The storing amount of the electric energy per weight/volume of the electric energy storage device including the battery, electrolytic condenser, electric double layer condenser, etc. is determined by the types of the active material. Accordingly, in order to increase the capacity of a unit package, the amount of the active material should be increased. When the thickness of the active material layer of the electrode is increased, the area of the electrode can be decreased, however, the electric resistance of the electrode increases and the efficiency of the active material decreases. Thus, the increase of the thickness of the active material layer is limited.

Recently, an electric energy storage device having a large capacity is manufactured by thinning an active material layer while enlarging the area of an electrode.

FIG. 2 is a perspective view of a conventional electric energy storage device for showing an integrated state of electrodes of a hexahedral shape. FIG. 3 is a cross-sectional view of the electrode illustrated in FIG. 2 cut along a line A—A' for schematically showing the integrated state of the electrodes.

Referring to FIGS. 2 & 3, cathodes 20a and 20b and an anode 22a which have square shapes are separated by separators 24a and 24b and they are integrated. At one side of each anode 20a and 20b and cathode 22a, a lead line is formed for a connection to terminals of cathode and anode. The lead lines are formed to respectively collect them into two groups having opposite directions according to their polarities.

Since the integrated state of the electrodes makes a hexahedron, the electrode is called a hexahedral shaped electrode.

FIG. 4 is a perspective view of a conventional electric energy storage device for showing an integrated state of electrodes of a cylindrical shape.

Referring to FIG. 4, since each electrode is wound and integrated into a cylindrical shape, the electrode is called to have a cylindrical shape. A plurality of cathodes 30a and 30b and a plurality of anodes 32a and 32b are integrated and are separated by separators 34a and 34b. At one side of each cathode 30a and 30b and anode 32a and 32b, a lead line is formed for a connection to terminals of a cathode and an anode. The lead lines are respectively collected into two groups according to their polarities.

For the hexahedral or cylindrical electrodes illustrated in FIGS. 2 & 4, some methods for manufacturing the lead lines and connecting them to the terminals are as follows. The lead lines can be manufactured by cutting the current collector, or the lead lines can be manufactured and connected to the terminals by molding onto the electrode. A method of fixing the lead lines by utilizing a rivet or a press, etc. can be exemplified.

However, for the hexahedral electrode, the integration of the electrodes are implemented as follows. First, the electrodes are cut into square shapes and the electrodes are integrated while inserting the separators between the cathodes and the anodes. Then, the cathodes of the electrodes are connected to the terminal of the cathode and the anodes are connected to the terminal of the anode. When the integration number of the electrodes increases, much time is taken and the reliability of the product is deteriorated.

For the cylindrical electrode, the lead lines are formed at the electrodes with a predetermined distance and the electrodes are wound into a cylindrical shape. Then, the lead lines are connected to the terminals of the cathode and the anode. When the number of the lead lines is small, this procedure is simple. However, when the number of the lead lines increases, the procedure is complicated.

For an electric energy storage device having a large capacity, currents having hundreds of amperes flow during charging/discharging. Therefore, a large number of lead lines is needed. This will decrease an electric resistance and so the increase of the number of the lead lines is advantageous for applying current of a high value.

However, for the cylindrical electrode, the increase of the number of the lead lines results in a complicated procedure for cutting a portion of an element to manufacture the lead lines or for manufacturing the lead lines. In addition, the adjustment of the positions of the cathodes and the anodes during the winding of the electrodes into the cylindrical shape also becomes difficult.

SUMMARY OF THE INVENTION

Accordingly, it is an object in the present invention to provide an electric energy storage device having a large capacity and a large number of lead lines, in which the integration of the electrodes is simple and reliable.

To accomplish the object, there is provided in the present invention an electric energy storage device comprising at least one electrode group in which a cathode, a separator and an anode are in regular sequence, repeatedly integrated and wound into a plate shape. The electrode group has lead lines collected at a predetermined position for a connection with a terminal.

The lead lines can be formed by cutting each side of the cathode and the anode before integrating the cathode, anode and separator into a plate shape or preferably, by cutting one side of the cathode and anode after integrating them.

Preferably, a plurality of the electrode groups are integrated with an insertion of a separator between the electrode groups to accomplish the large capacity of the device. The electric energy storage device further comprises a case for including the plurality of the integrated electrode groups and an electrolyte filling up the inside of the case.

According to the present invention, the integration of the electrodes and the formation of the lead lines from the electrodes are very advantageous. Therefore, the manufacture of the electric energy storage device having a large capacity is very advantageous.

BRIEF DESCRIPTION OF THE DRAWINGS

The above object and advantages of the present invention will become more apparent by describing in detail preferred embodiments thereof with reference to the attached drawings in which.

DESCRIPTION OF THE PREFERRED EMBODIMENT

The present invention will be explained in more detail with reference to the attache drawings hereinbelow.

First Embodiment

Figure 1:
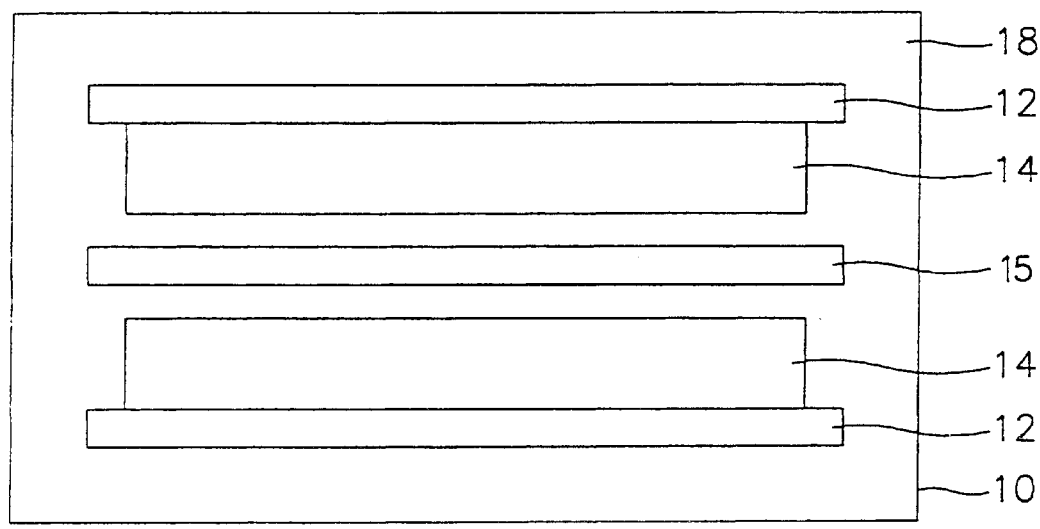
FIG. 1 is a schematic diagram of a unit cell of a conventional electric energy storage device.
Figure 2:
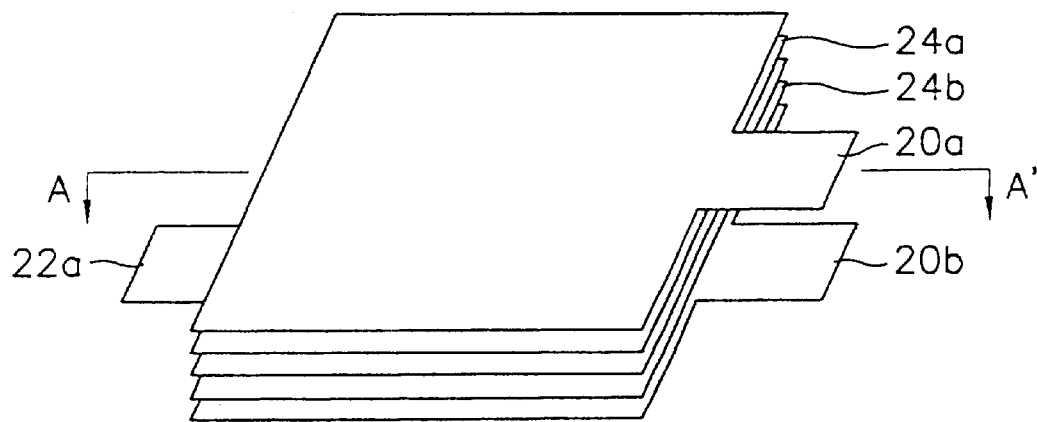
FIG. 2 is a perspective view of a conventional electric energy storage device for showing an integrated state of electrodes of a hexahedral shape.
Figure 3:
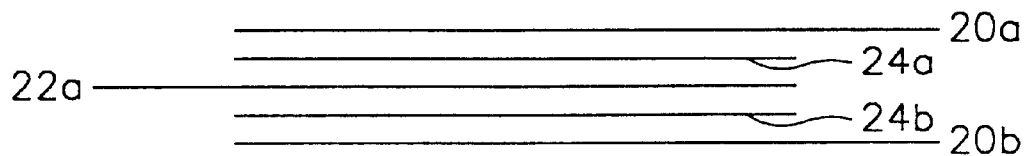
FIG. 3 is a cross-sectional view of the electrode illustrated in FIG. 2 cut along a line A—A' for schematically showing the integrated state of the electrodes.
Figure 4:
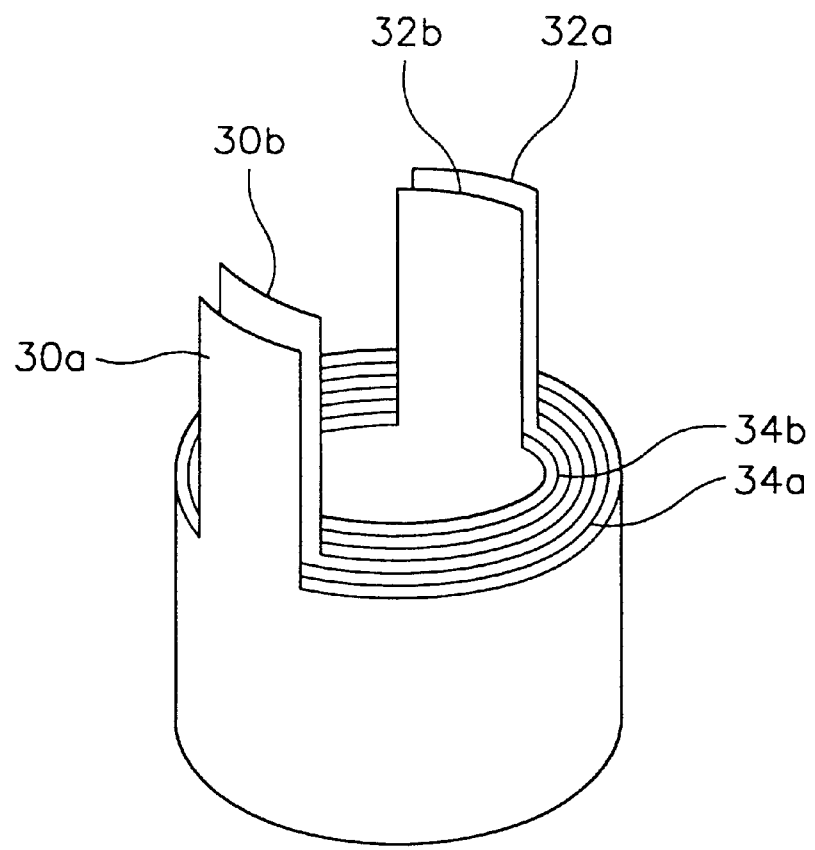
FIG. 4 is a perspective view of a conventional electric energy storage device for showing an integrated state of electrodes of a cylindrical shape.
Figure 5:
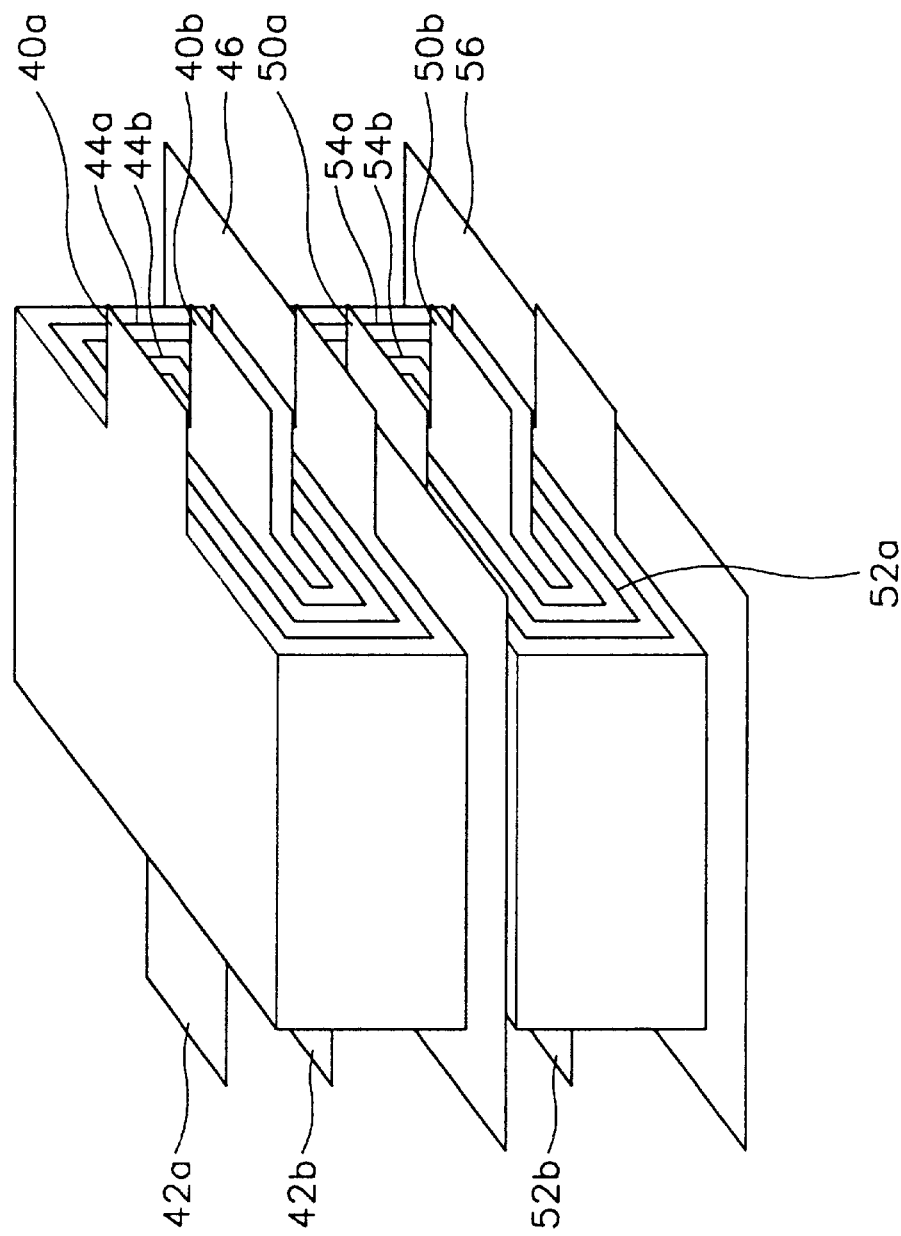
FIG. 5 is a perspective view of an integrated state of an electrode according to a first embodiment of the present invention.

FIG. 5 is a perspective view of an integrated state of an electrode according to a first embodiment of the present invention.

Referring to FIG. 5, an electric energy storage device according to this embodiment includes i) a first electrode group in which a plurality of first cathodes 40a and 40b and first anodes 42a and 42b separated by first separators 44a and 44b are integrated and first cathodes 40a and 40b, first anodes 42a and 42b and first separators 44a and 44b are wound into a plate shape ii) a second electrode group in which a plurality of second cathodes 50a and 50b and second anodes 52a and 52b separated by second separators 54a and 54b are integrated and second cathodes 40a and 40b, second anodes 42a and 42b and second separators 44a and 44b are wound into a plate shape and iii) a third separators 46 and 56 formed between the first electrode group and the second electrode group.

At sides of first and second cathodes 40a, 40b, 50a and 50b and first and second anodes 42a, 42b, 52a and 52b of the electrode groups, lead lines are formed for connecting the first and second cathodes 40a, 40b, 50a and 50b and first and second anodes 42a, 42b, 52a and 52b to respective terminals of a cathode and an anode. The lead lines are separated and collected according to their polarity to the opposite directions to each other.

The lead lines can be formed by cutting each side of the cathode and the anode before integrating the cathode, anode and separator into a plate shape or preferably, by cutting one side of the cathode and anode by utilizing an apparatus such as a press after winding them.

Accordingly, when comparing the latter method described above in which the lead lines are formed after implementing the winding process, with the conventional method in which the lead lines are formed onto the electrode in advance of the winding process, the manufacturing process of the present invention can be simplified.

Second Embodiment

Figure 6:
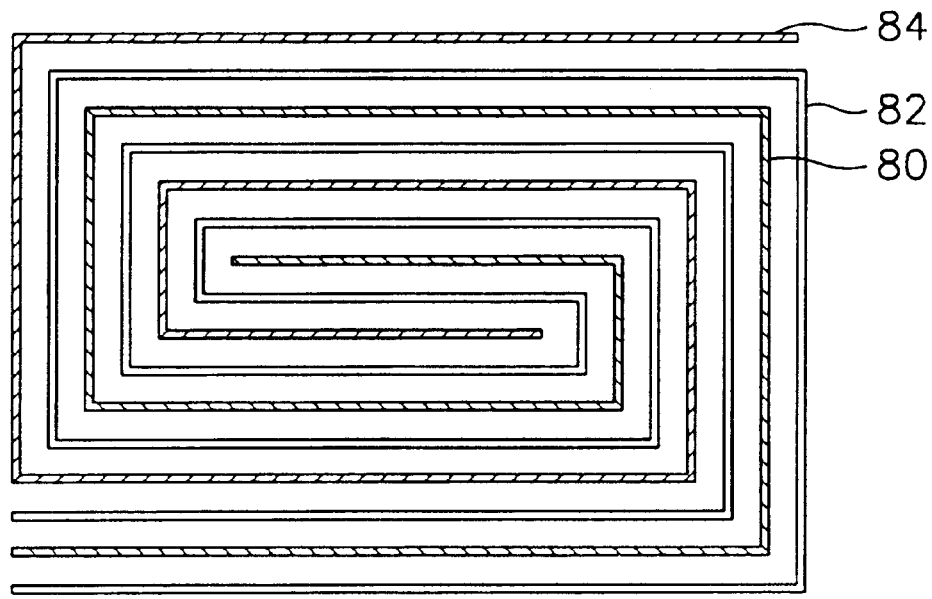
FIG. 6 is a cross-sectional view of an electrode group manufactured by a second embodiment of the present invention.
Figure 8:
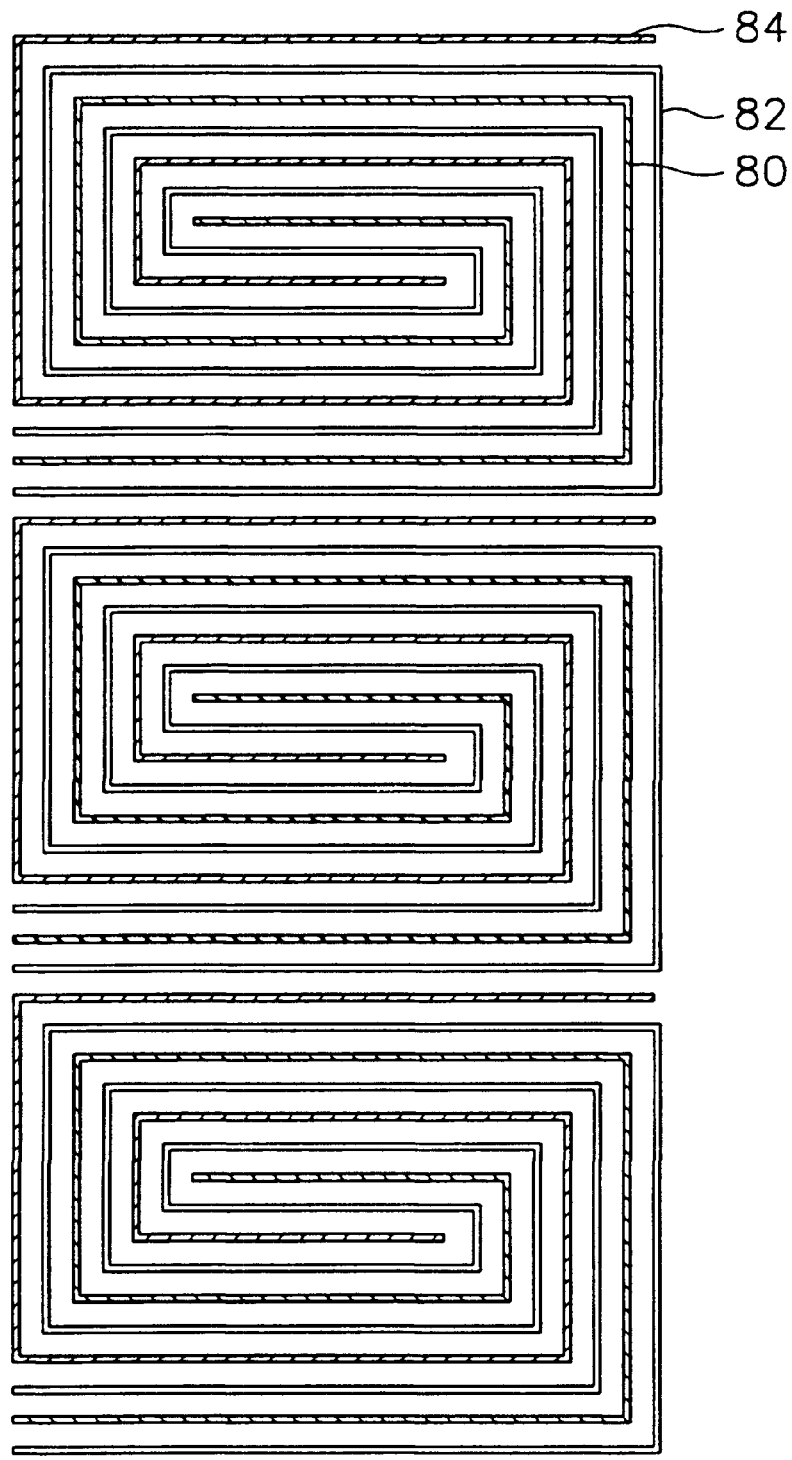
FIG. 8 is a cross-sectional view of three electrode groups manufactured by a second embodiment of the present invention, which are connected in parallel.

FIG. 6 is a cross-sectional view of an electrode group manufactured by a second embodiment of the present invention and FIG. 8 is a cross-sectional view of three electrode groups manufactured by a second embodiment of the present invention, which are connected in parallel.

Referring to FIG. 6, the electric energy storage device of this embodiment includes at least one electrode group having a cathode 80, an anode 84 and a separator 82 inserted between them.

When lead lines are formed with a predetermined interval by cutting the cathode and anode before implementing the winding process and when the length of the electrodes become long, the lead lines are not positioned at a predetermined place after the winding, thereby resulting in a difficult connection with a terminal. Therefore, the formation of the lead lines with a constant interval considering this point is a very complicated task.

Further, the formation of the lead lines by cutting the electrodes after winding the electrodes and the separator into a plate shape also is difficult when the length of the electrodes is long.

Therefore, when the electrodes are long, the electric energy storage device is preferably manufactured by a plurality of electrode groups. Each electrode group is obtained by winding electrodes and separators into a plate shape and has lead lines collected at a predetermined position. The lead lines of each electrode group are connected with a terminal in parallel method.

Cathode 80, anode 84 and separator 82 are integrated so that separator 82 is always inserted between cathode 80 and anode 84 after winding them. From one side of the wound electrode group, cathode 80 or anode 84 is exposed and from the other side, separator 82 is exposed.

Thus manufactured electrode group has an integrating sequence of cathode-separator-anode-separator-cathode. Accordingly, the center portion of the electrode group also can be utilized as a capacitor.

Various methods for manufacturing the electrode group having the above-described structure can be exemplified and one method among them will be explained below.

Cathode 80, anode 84 and separator 82 of which length is twice of that of anode 84 are prepared. On one side of separator 82, cathode 80 is positioned and below the same side of separator 82, anode 84 is positioned. Then, one end portion of anode 84 is positioned at one end portion of separator 82 and the other end portion of anode 84 is positioned at the center portion of separator 82 so that anode 84 and half of separator 82 overlap. Cathode 80 is positioned on the opposite side of anode 84 with respect to separator 82. At this time, cathode 80 is shifted outward from the center portion of separator 82 by the length of a horizontal portion and a bent portion which will be subsequently formed after winding.

After integrating cathode 80, separator 82 and anode 84, separator 82 is folded so that the non-overlapped portion of separator 82 overlaps anode 84.

After that, the integrated cathode 80, separator 82 and anode 84 are wound clockwise with the center portion of separator 82 as a center. The winding is implemented so that the horizontal portion of cathode 80 faces the horizontal portion of anode 84 to complete the electrode illustrated in FIG. 6.

Figure 7:
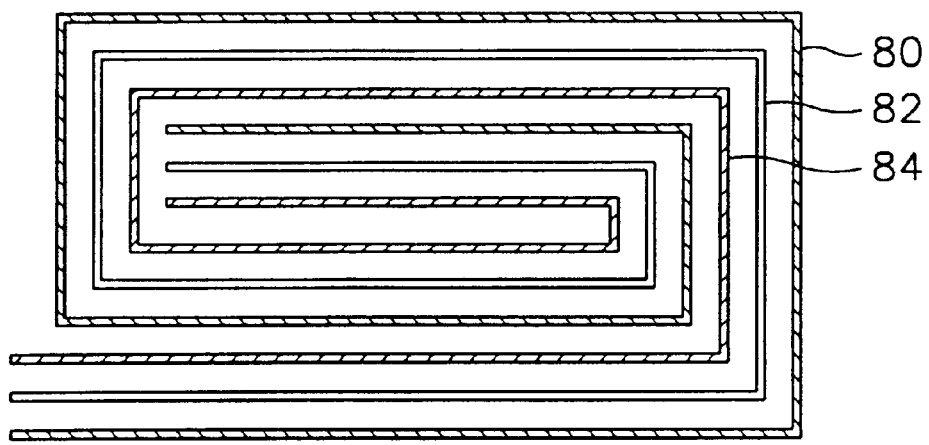
FIG. 7 is a cross-sectional view of an electrode group illustrated for the comparison with an electrode group of the present invention.

FIG. 7 is a cross-sectional view of an electrode group illustrated for the comparison with an electrode group in FIG. 6 according to this embodiment of the present invention.

Referring to FIG. 7, electrodes 80 and 84 having the same length and separator 82 are subsequently formed and wound to manufacture an electrode group illustrated in FIG. 7. At the center portion, the same electrode becomes to meet after winding and this portion could not be utilized as a capacitor.

However, the electrode group has an integration order of anode-separator-cathode-separator-anode from the exterior according to the present invention as illustrated in FIG. 6.

FIG. 8 is a cross-sectional view of three electrode groups having the structure illustrated in FIG. 6, which are connected in parallel.

Referring to FIG. 8, when integrating a plurality of electrode groups, neighboring electrodes between two neighboring electrode groups have opposite polarities. And for reducing resistance for increasing the efficiency of the electrodes, it is preferred that the electrode groups are wound so that the last surface of anode 84 or cathode 80 is not covered with separator 82.

The electrode group is manufactured so that cathode 80 is exposed at one side of the electrode group and separator 82 is exposed at the other side of the electrode group. Then, the electrode groups are aligned so that a surface of cathode 80 or anode 84 of one electrode group is adjacent to separator 82 of neighboring electrode group.

At this time, it is preferred that the number of the horizontal lines of cathode 80 and anode 84 of the electrode group become even number and the electrode groups of the same shape are integrated so that they have the same repeated pattern.

When the number of the horizontal lines of cathode 80 and anode 84 is odd number, the structure having the plurality of the electrode groups as described above cannot be obtained.

Cathode 80 and anode 84 of the plurality of electrode groups are respectively molded or connected through the lead lines by utilizing a rivet onto terminals of a cathode and an anode. Then thus obtained structure is put into a case and then an electrolyte is injected within the case to manufacture an electric energy storage device having a large capacity.

According to the second embodiment of the present invention, the number of the lead lines can be increased and the integration of the electrodes is simplified and advantageous.

Third Embodiment

Figure 9:
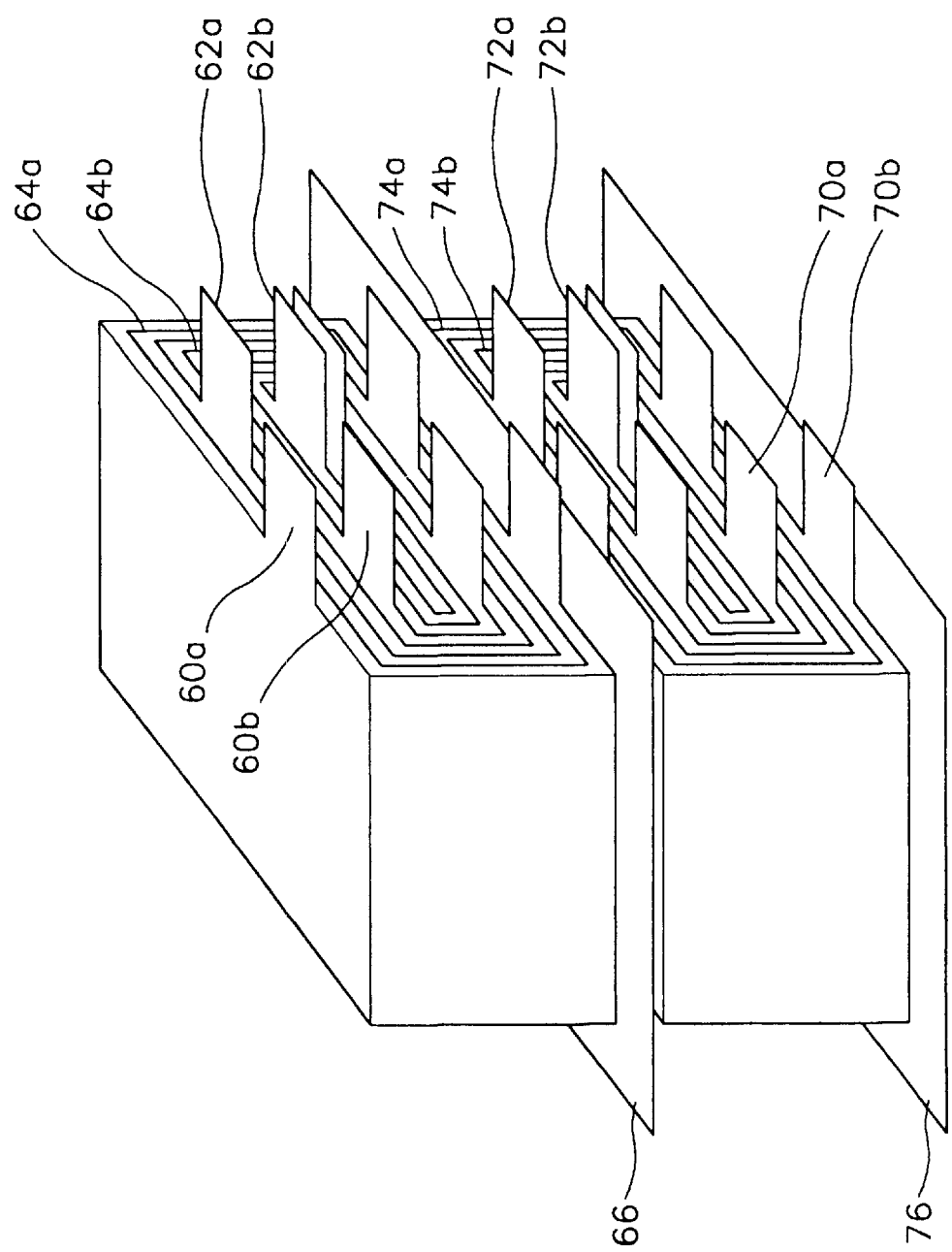
FIG. 9 is a perspective view of an integrated state of electrode groups according to a third embodiment of the present invention.

FIG. 9 is a perspective view of an integrated state of an electrode according to a third embodiment of the present invention.

Referring to FIG. 9, the electric energy storage device of this embodiment includes i) a first electrode group in which a plurality of first cathodes 60a and 60b and first anodes 62a and 62b separated by first separators 64a and 64b are integrated and first cathodes 60a and 60b, first anodes 62a and 62b and first separators 64a and 64b are wound into a plate shape ii) a second electrode group in which a plurality of second cathodes 70a and 70b and second anodes 72a and 72b separated by second separators 74a and 74b are integrated and second cathodes 60a and 60b, second anodes 62a and 62b and second separators 64a and 64b are wound into a plate shape and iii) a third separators 66 and 76 formed between the first electrode group and the second electrode group.

At side portions of first and second cathodes 60a, 60b, 70a and 70b and first and second anodes 62a, 62b, 72a and 72b of the electrode groups, lead lines are formed for connecting the first and second cathodes 60a, 60b, 70a and 70b and first and second anodes 62a, 62b, 72a and 72b to respective terminal of a cathode and an anode. The lead lines are collected into two groups to the same direction.

The basic structure of this embodiment is the same with that of the first embodiment. However, different from the first embodiment, the lead lines are divided into two groups and collected to the same direction in this embodiment.

The plurality of first and second cathodes 60a, 60b, 70a and 70b and first and second anodes 62a, 62b, 72a and 72b have the structure composed of a current collector and an active material layer formed on the current collector.

According to the third embodiment, the number of the lead lines is increased and the integrating procedure of the electrodes is simple and advantageous as in the first embodiment.

According to the present invention, since a cathode and an anode are wound with the insertion of a separator between them into a plate shape, the increase of the number of the lead lines is advantageous. In addition, the cutting of a portion of the electrode to form the lead line is an easy task. Accordingly, the manufacture of the electric energy storage device having a large capacity is very advantageous.

While the present invention is described in detail referring to the attached embodiments, various modifications, alternate constructions and equivalents may be employed without departing from the true spirit and scope of the present invention.

What is claimed is:

1. An electric energy storage device comprising a plurality of electrode groups in which each group includes a cathode, a separator and an anode in regular sequence, repeatedly integrated and alternatively wound into a plate shape, each said plurality of electrode groups having lead lines separated and collected at predetermined positions for connection with a terminal, said predetermined positions being defined by said lead lines which are formed by cutting said cathode and said anode of each said group, and each said plurality of electrode groups being connected in parallel and said parallel connected plurality of electrode groups forming first and second neighboring electrode groups with one side of either said first or second neighboring electrode group having said anode exposed and another side of said neighboring electrode group having said separator exposed.

2. The electric energy storage device as claimed in claim 1, wherein said anode is exposed at one side of said electrode group and said separator is exposed at the other side of said electrode group.

3. The electric storage device as claimed in claim 1, wherein polarities of a first surface on which said anode or said cathode of said first electrode group is formed and a second surface on which said cathode or said anode of said second electrode group is formed and which is neighbored to said first surface, are opposite.

4. The electric energy storage device as claimed in claim 1, wherein said cathode and said anode respectively include an even number of horizontal lines.

5. The electric energy storage device as claimed in claim 2, wherein said cathode and said anode respectively include an even number of horizontal lines.

6. The electric energy storage device as claimed in claim 3, wherein said cathode and said anode respectively include an even number of horizontal lines.

7. The electric energy storage device as claimed in claim 3, wherein said lead lines are formed by cutting each side of said cathode and said anode.

8. An electric energy storage device comprising a plurality of electrode groups in which each said group includes a cathode, a separator and an anode in regular sequence, repeatedly integrated and alternatively wound into a plate shape with said separator between said cathode and said anode, each said electrode group having lead lines separated and collected at predetermined positions for connection with a terminal, said predetermined positions being defined by said lead lines which are formed by cutting said anode and said cathode of each said group, and each said plurality of electrode groups being connected in parallel and said parallel connected plurality of electrode groups forming first and said second neighboring electrode groups with one side of either said first or second neighboring electrode group having said cathode exposed and another side of said neighboring electrode group having said separator exposed.

9. The electric energy storage device as claimed in claim 8, wherein said cathode is exposed at one side of said electrode group and said separator is exposed at the other side of said electrode group.

10. The electric storage device as claimed in claim 8, wherein polarities of a first surface on which said anode or said cathode of said first electrode group is formed and a second surface on which said cathode or said anode of said second electrode group is formed and which is neighbored to said first surface, are opposite.

11. The electric energy storage device as claimed in claim 8, wherein said anode is exposed at one side of said electrode group and said separator is exposed at the other side of said electrode group.

12. The electric energy storage device as claimed in claim 1, wherein said cathode and said anode respectively include an even number of horizontal lines.

13. The electric energy storage device as claimed in claim 10, wherein said cathode and said anode respectively include an even number of horizontal lines.

14. The electric energy storage device as claimed in claim 8, wherein said lead lines are formed by cutting each side of said cathode and said anode.

* * * * *